March 9, 1971    V. C. HAMMOND    3,568,397

METHOD FOR ENCAPSULATING RING-SHAPED OBJECTS

Filed June 27, 1969

*INVENTOR.*
VIRGIL C. HAMMOND
BY

United States Patent Office 3,568,397
Patented Mar. 9, 1971

3,568,397
METHOD FOR ENCAPSULATING RING-SHAPED OBJECTS
Virgil C. Hammond, Kansas City, Mo., assignor to the United States of America as represented by the United States Atomic Energy Commission
Filed June 27, 1969, Ser. No. 837,071
Int. Cl. B65b 31/00
U.S. Cl. 53—22                    1 Claim

ABSTRACT OF THE DISCLOSURE

Disclosed is a method for encapsulating a ring-shaped object, such as a transformer core or coil, comprising the steps of establishing a vacuum about the ring, heating a first sheet of plastic, allowing the plastic to be drawn about a portion of the ring, trimming the excess plastic, and repeating the process with a second sheet of plastic over the uncovered portions of the ring.

BACKGROUND OF INVENTION

This invention relates to encapsulating methods and more particularly to a method for encapsulating ring-shaped objects.

Often in the manufacture of electrical components, forming a complete encapsulating seal about each component to mechanically and electrically isolate it from its surroundings is desirable. Forming such seal on irregularly shaped objects, especially ring-shaped objects such as transformer cores or transformer coils, is particularly difficult because of the necessity to achieve a sealing coat both on the inside and outside diameters of the ring. This difficulty may be compounded if the component has been exposed to silicone oil or other material with which an adherent bond is not easily made.

DESCRIPTION OF PRIOR ART

In attempts to overcome these difficulties, rigid casings into which magnetic coils or the like may be placed have been disclosed. Such casings, however, require an undesirable cushioning material between the core and casing. Additionally, a method in which a pre-formed sheet of material is pulled over the core, and cemented into position has also been proposed. Aside from the difficulty of performing the method, the pre-formed material may not fit as snugly as desirable.

SUMMARY OF INVENTION

It is, therefore, a primary object of the invention to provide a method of encapsulating ring-shaped objects to provide a snug-fitting seal about the object to mechanically and electrically isolate the object from its surroundings.

It is a further object to provide a method which will create an effective seal about ring-shaped objects which have been exposed to silicone oil or other materials with which adherent bonds are not easily made.

These and other objects, features, and advantages will become apparent to one skilled in the art after examination of the description of the invention, drawing and claims, set forth below.

To be understood at this juncture is that the term "ring-shaped object" as used herein is intended to refer to any toroidal, ring, doughnut, or other shape having a hollow central portion or cavity, and is not intended to be limited in scope to its literal meaning conveying the idea of a circular or round shape.

In accordance with the present invention, a ring-shaped component is placed upon one side of a substrate having a plurality of holes drilled therein, the cavity of the ring being coaxially positioned with respect to one of the holes. Each hole communicates with a vacuum established on the other side of the substrate, thus creating a vacuum about the ring.

A plastic sheet then is positioned above the ring, and is heated to become pliable. The sheet is lowered onto the ring, and is pulled and formed by the vacuum into close proximity with the upper and vertical surfaces of the ring. The plastic is then allowed to cool and solidify and the excess plastic trimmed. The ring is turned over, and the process repeated, thereby to form a second layer of plastic about the bottom, and again about the vertical sides of the ring.

Because the plastic is formed over the ring by a vacuum process, a very snug fit is achieved between the plastic and the component, thereby making the encapsulating material rely only upon its snug fit to form an effective seal without any physical bond to the ring itself by cement or bonding material, as heretofore required.

BRIEF DESCRIPTION OF DRAWING

Like reference numbers refer to like parts in the respective figures of the drawing.

DETAILED DESCRIPTION OF INVENTION

Figure 1:
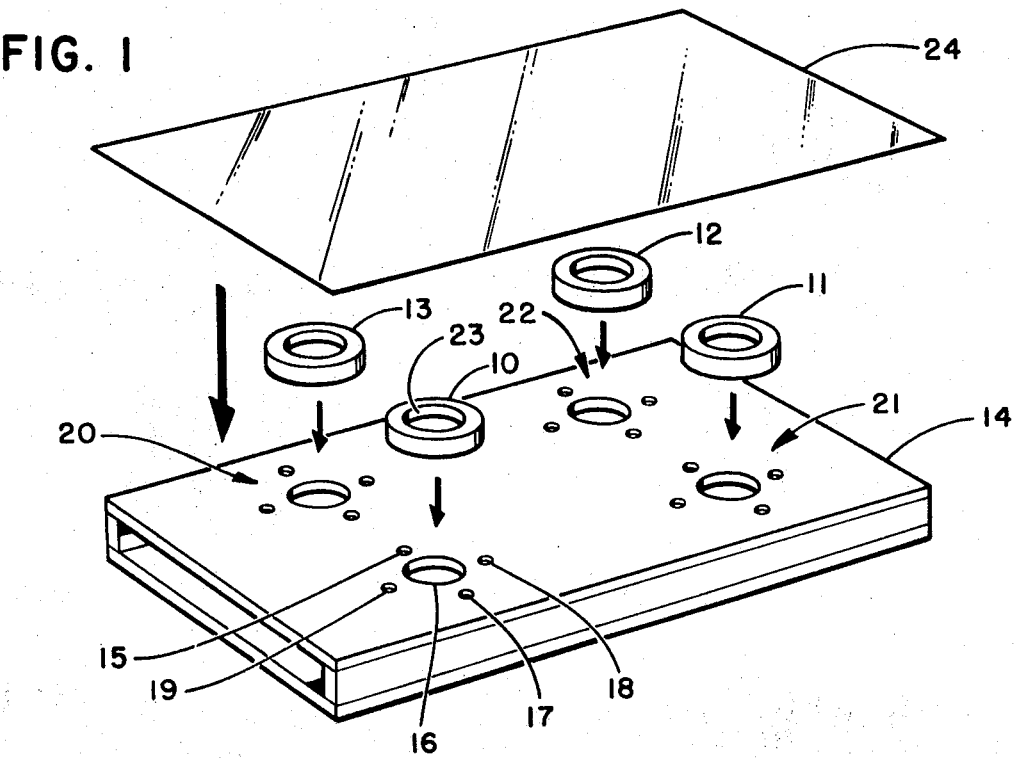
FIG. 1 is a perspective vew of the apparatus used to simultaneously encapsulate a plurality of ring-shaped objects in accordance with the method of the invention.

With reference to the drawing, the first step of the method of the invention is shown in FIG. 1. The rings 10, 11, 12, and 13 to be encapsulated may be of any material, such as wood, metal, coils of wire, or glass, for example, and, as abovesaid, may be exposed to silicone oil or other nonadhering substance. Each ring is positioned upon substrate 14, in which are formed a plurality of holes such as holes 15–19 and those groups of holes indicated by numbers 20, 21, and 22, each communicating with the underside of the substrate 14 at which a vacuum is created by a pump or other well known vacuum creating device (not shown). Although substrate 14 may be of any rigid material such as metal, wood, or the like, the particular material used should be relatively insensitive to heat, since application of heat is required in the practice of the method of the invention, as discussed below. Additionally, it has been found that if the surface of substrate 14 is made slightly rough, or if a material such as plywood or the like is used which is inherently slightly rough, the process is made easier to perform with a better encapsulant resulting, since the roughened surface apparently aids the distribution of the vacuum across the surface of substrate 14.

The cavity of each ring is positioned coaxially with one of the holes in the substrate; for example, cavity 23 of ring 10 is positioned coaxially with hole 16, to enable the vacuum to be established at all areas surrounding the ring, including the cavity 23. The diameter of the holes over which the rings are positioned should be about the same size as the inner diameter of each ring defining its interior cavity; however, the size of the holes is not critical.

To be understood is that although substrate 14 is illustrated with only four sets of holes, i.e., holes 15–19, 20, 21, and 22, any number of holes may be used so that the method of the invention can be simultaneously practiced upon any number of ring-shaped components. For clarity, the invention is described hereinafter only with respect to ring 10 as seen in FIG. 1, and as seen in cross-section in FIGS. 2–5.

Figure 2:
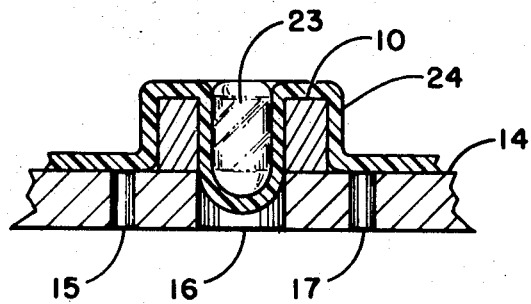
FIGS. 2–5 are cross-sectional views of one of the rings to be encapsulated and the apparatus used in the method, as shown in FIG. 1, illustrating, in sequence, the various steps followed in practicing the method of the invention, the sizes of the parts being exaggerated for purpose of illustration.
Figure 3:
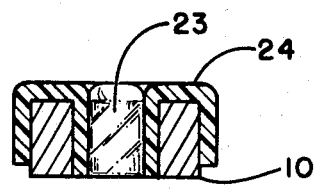

In accordance with the invention, a first sheet 24, of a plastic material is positioned above the substrate 14 and ring 10. The plastic material may be of any plastic composition, which may be chosen for the particular desired application. For example, where an electrically insulating function is desired, cellulose acetate butyrate or other insulating plastic material may be used. The thickness of the sheet also may be varied depending upon the application, the voltages to be encountered, and the desired convenience of handling. A convenient thickness, for example, of cellulose acetate butyrate may be about 0.010 inch. The plastic sheet 24 is then heated until it becomes pliable, lowered onto ring 10 and substrate 14, and is pulled and formed by the vacuum beneath the substrate into and through the interior cavity 23 of ring 10, and along the sides of the ring towards holes 15, 17, 18, and 19 to form fit about the top and vertical sides of ring 10, as shown in FIG. 2. After cooling, the excess material from plastic sheet 24 is trimmed from the ring 10, to form a three-sided seal, as shown in FIG. 3.

Figure 4:
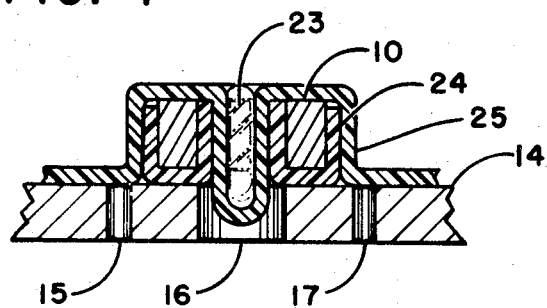
Figure 5:
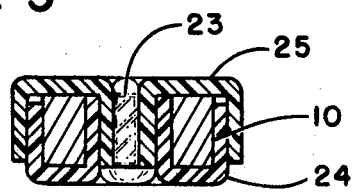

The ring 10 is then turned over on the substrate 14, and process is repeated on the unsealed side of ring 10 with a second plastic sheet 25, which is, as was plastic sheet 24, pulled by the vacuum created in the interior cavity 23 and about the exterior of ring 10 to fit snugly about the vertical sides previously coated with plastic sheet 24 and the unsealed surface of ring 10, as illustrated in FIG. 4. The excess of plastic sheet 25 is trimmed to completely encapsulate ring 10, as shown in FIG. 5. Thus, the top and bottom surfaces are covered with one layer of plastic 25 and 24, respectively, and the inside and outside surfaces of ring 10 are coated with two layers of plastic 24 and 25.

Although the invention has been described and illustrated with a certain degree of particularity, it will be appreciated that the present disclosure has been made only by way of example and that various modifications in the details of the method will become apparent to one skilled in the art and may be resorted to without departing from the spirit and scope of the invention as hereinafter claimed.

What I claim is:

1. A method for encapsulating and electrically and mechanically sealing a ring-shaped transformer coil having an annular portion disposed about a central cavity comprising: aligning said coil on a substrate having a roughened surface and a plurality of holes therethrough with the cavity of said coil coaxially disposed about one of said holes and substantially coextensive in diameter and communicating therewith, positioning a first plastic sheet overlying said coil and substrate, establishing and distributing a vacuum about said coil and between said coil and said substrate along the roughened surface of said substrate and within the cavity of said coil, heating said first plastic sheet adjacent said coil until it becomes pliable, drawing said first sheet by said vacuum into close proximity with the exposed surfaces and through the cavity of said coil and partially through the hole of said substrate coextensive with said coil cavity, trimming excess of said first plastic sheet from said coil, inverting the partially encapsulated coil on said substrate with its cavity substantially coextensive and in alignment with a hole of said substrate, positioning a second plastic sheet overlying said coil and substrate, again establishing and distributing a vacuum about said coil and between the partially encapsulated coil and said substrate along the roughened surface of said substrate and within the partially encapsulated cavity of said coil, heating said second plastic sheet adjacent said coil until it becomes pliable, drawing said second sheet by said vacuum into close proximity with the exposed surfaces and partially encapsulated surfaces of said coil and through the cavity of the coil and partially through the hole of said substrate coextensive with said coil cavity to completely encapsulate said coil to provide electrical and mechanical sealing thereof, and trimming excess of said second plastic sheet from said coil.

References Cited
UNITED STATES PATENTS

| | | | |
|---|---|---|---|
| 1,856,694 | 5/1932 | De Correvont | 53—112X |
| 3,024,579 | 3/1962 | Stockhausen et al. | 53—22 |

TRAVIS S. McGEHEE, Primary Examiner